Patented Nov. 11, 1924.

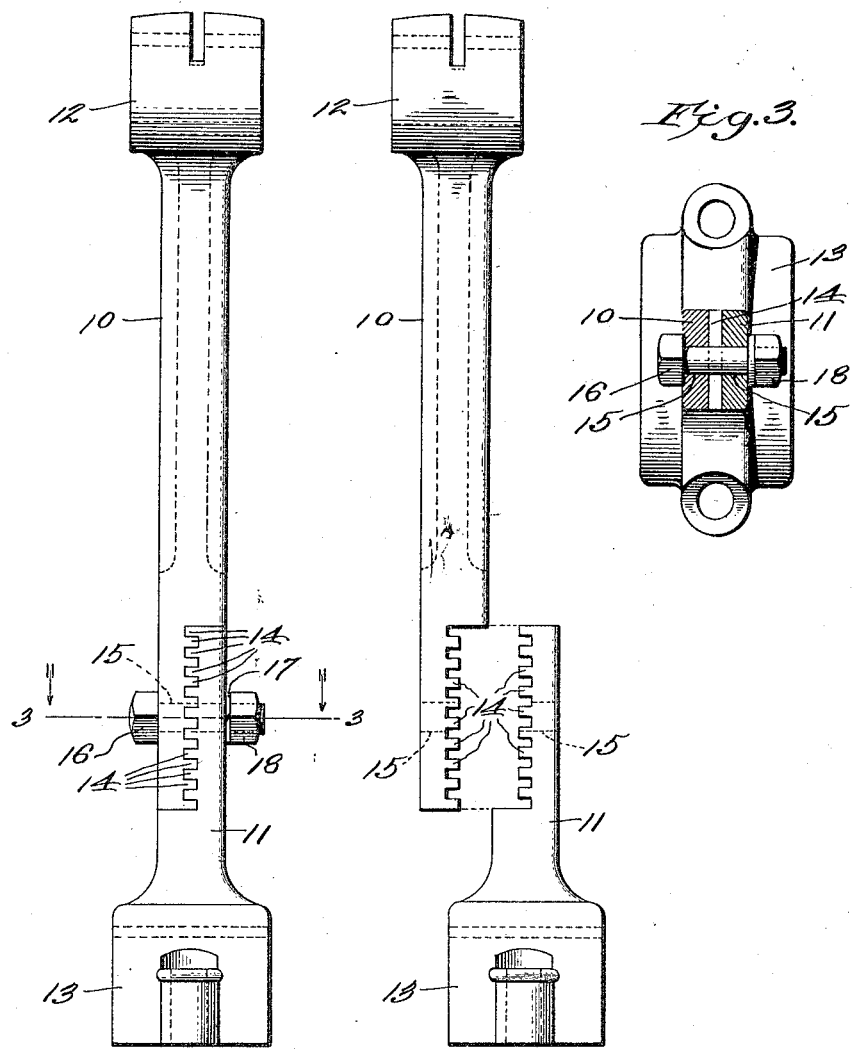

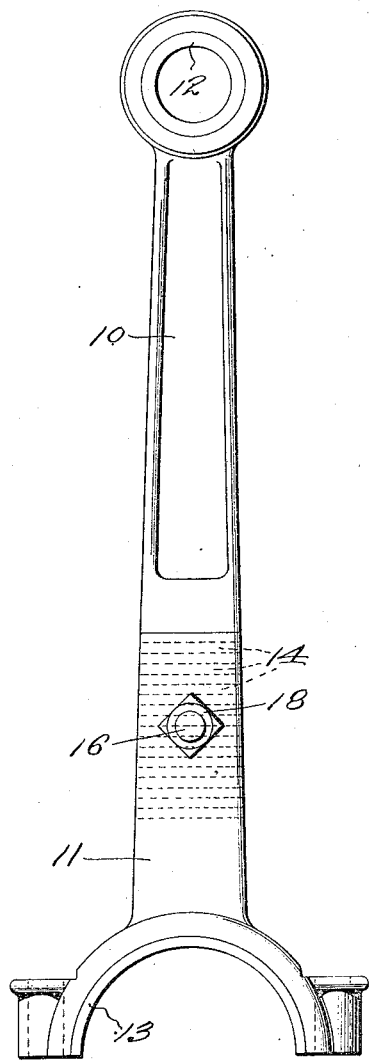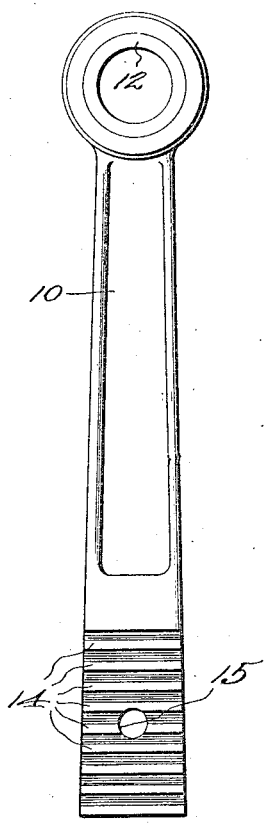

1,514,652

UNITED STATES PATENT OFFICE.

ELLIS KIMPTON BURMASTER, OF MILWAUKEE, WISCONSIN.

CONNECTING ROD.

Application filed July 9, 1923. Serial No. 650,525.

*To all whom it may concern:*

Be it known that I, ELLIS K. BURMASTER, a citizen of the United States, residing at Milwaukee, in the county of Milwaukee and State of Wisconsin, have invented new and useful Improvements in Connecting Rods, of which the following is a specification.

This invention relates to internal combustion engines, and has particular application to the connecting rod which operatively associates the piston with the crank shaft of the motor.

The chief characteristic of the present invention resides in providing a two part connecting rod which parts are connected together in a manner which allows them to be quickly and conveniently separated when it is necessary, thereby enabling a repairing job to be done in a minimum of time, such as for instance replacing old pistons or piston rings, as the pistons with a section of the connecting rod can be removed from the cylinder without loosening or otherwise interfering with the crank shaft bearing.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation of a connecting rod constructed in accordance with the present invention.

Figure 2 is a view similar to Figure 1, but showing the sections of the connecting rod separated.

Figure 3 is a horizontal sectional view taken on line 3—3 of Figure 1.

Figure 4 is an elevation of the device taken at right angles to Figure 1, and

Figure 5 is a front elevation of one of the sections embodied in the invention.

Referring to the drawings in detail, it will be noted that the connecting rod forming the subject matter of the present invention is made up of two sections 10 and 11 respectively. These sections are of unequal length, the section 10 being considerably longer than the section 11, with the section 10 constituting the upper section and therefore designed to provide the usual bearing 12 for the wrist pin "not shown". The lower section 11 is also formed with one portion of the crank shaft bearing indicated at 13. The adjacent ends of these respective sections are reduced to overlap, the combined thickness of the overlapped extremities being equal to the remaining portion of the connecting rod as clearly illustrated. The confronting faces of these overlapped extremities are provided with teeth 14, the teeth extending across the entire width of each extremity and arranged so that the teeth of one extremity are interlocked with the teeth of the other extremity as clearly illustrated in Figure 1. Each extremity is provided with an opening 15, the openings being disposed in alignment when the sections are associated to accommodate a retaining bolt 16 which passes transversely through the overlapped extremities, after which the lock washer 17 and the nut 18 are associated therewith to prevent casual separation of the parts.

This construction is very meritorious in that it allows the pistons to be removed from the cylinders through the top thereof, subsequently to separating the connecting rod sections, so that the rings or pistons can be replaced without removing or loosening the crank shaft bearings. Then again, the crank shaft bearings can be adjusted and properly tightened without the usual trouble experienced by what is known as piston dragging. The section 10 can be separated from the section 11 and moved upwardly in the cylinder, the crank shaft bearings are properly tightened, and this can be accomplished without moving from beneath the vehicle, which is always necessary with the present day one piece rod in order to turn the crank shaft by the crank handle from time to time with a view to determining the tightness of the bearing. Then again, in case of breakage of any connecting rod, either section can be replaced at a minimum cost.

While it is believed that from the foregoing description, the nature and advantages of the invention will be readily understood, I desire to have it known that I do not limit myself to what is herein shown and described and that such changes may be resorted to when desired as fall within the scope of what is claimed.

Having thus described the invention, I claim:

A connecting rod for an internal combustion engine piston comprising a pair of sections, each of which has its inner face cut away at their adjacent ends to afford a right angular abutment with which their adjacent ends of the sections engage, and coacting horizontally disposed parallel teeth formed upon the inner faces of the adjacent ends and arranged in interlocking engagement, and a fastening element passing transversely through the cut away ends to detachably connect the sections.

In testimony whereof I affix my signature.

ELLIS KIMPTON BURMASTER.